Oct. 20, 1931.  W. S. PRITCHARD  1,828,069

WINDSHIELD

Filed May 16, 1927  2 Sheets-Sheet 1

Inventor
William S. Pritchard

By

Attorney's

Oct. 20, 1931.  W. S. PRITCHARD  1,828,069
WINDSHIELD
Filed May 16, 1927   2 Sheets-Sheet 2
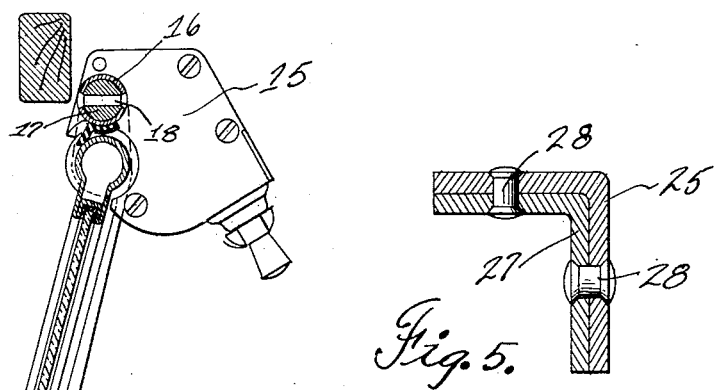
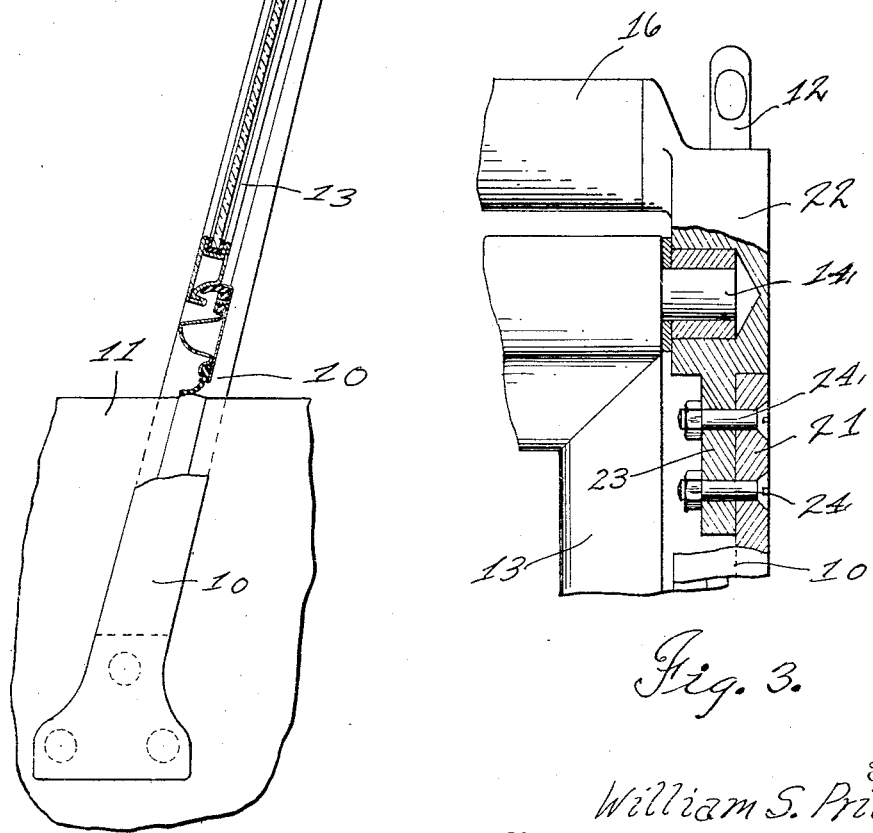
Inventor
William S. Pritchard
By
Attorneys Patented Oct. 20, 1931

1,828,069

UNITED STATES PATENT OFFICE

WILLIAM S. PRITCHARD, OF DETROIT, MICHIGAN, ASSIGNOR TO MOTOR PRODUCTS CORPORATION, OF DETROIT, MICHIGAN, A CORPORATION OF NEW YORK

WINDSHIELD

Application filed May 16, 1927. Serial No. 191,867.

This invention relates to windshields and more especially to improvements in the means for supporting the windshield and the operating mechanism therefor, in motor vehicles of the open type.

The trend of the style or design of motor vehicles at the present favors the use of windshields having a single operating mechanism for actuating the windshield to move the same from closed to open position, with closed types of bodies such as sedans and coupés no difficulty has been experienced in the use of this type of windshield as the upper header of these closed bodies provides adequate support for the windshield operating mechanism. However, it has generally been impractical to use this type of windshield in open or convertible types of bodies because in such cases the design of the top or body provided no permanent or fixed support to which the windshield operating mechanism might be conveniently attached. As a consequence, manufacturers generally have been content to use, with these types of bodies, the old and less efficient type of windshield provided with the operating means at the sides thereof.

It is therefore, one of the primary objects of this invention to provide means for supporting the windshield operating mechanism in open or convertible types of vehicle bodies and to also produce a construction of this character which may be readily assembled with the standard parts of such bodies and which may be manufactured and assembled economically and with dispatch.

The several objects, advantages and novel details of construction of this invention will be made more apparent as this description proceeds, especially when considered in connection with the accompanying drawings wherein:

Figure 2 is a vertical sectional view taken substantially on the plane indicated by line 2—2 in Figure 1.

Figure 3 is a fragmentary sectional elevational view showing a modified form of connection between the supporting and stanchion members.

Figure 5 is a fragmentary sectional view taken substantially on the plane indicated by line 5—5 in Figure 4.

Figure 1:
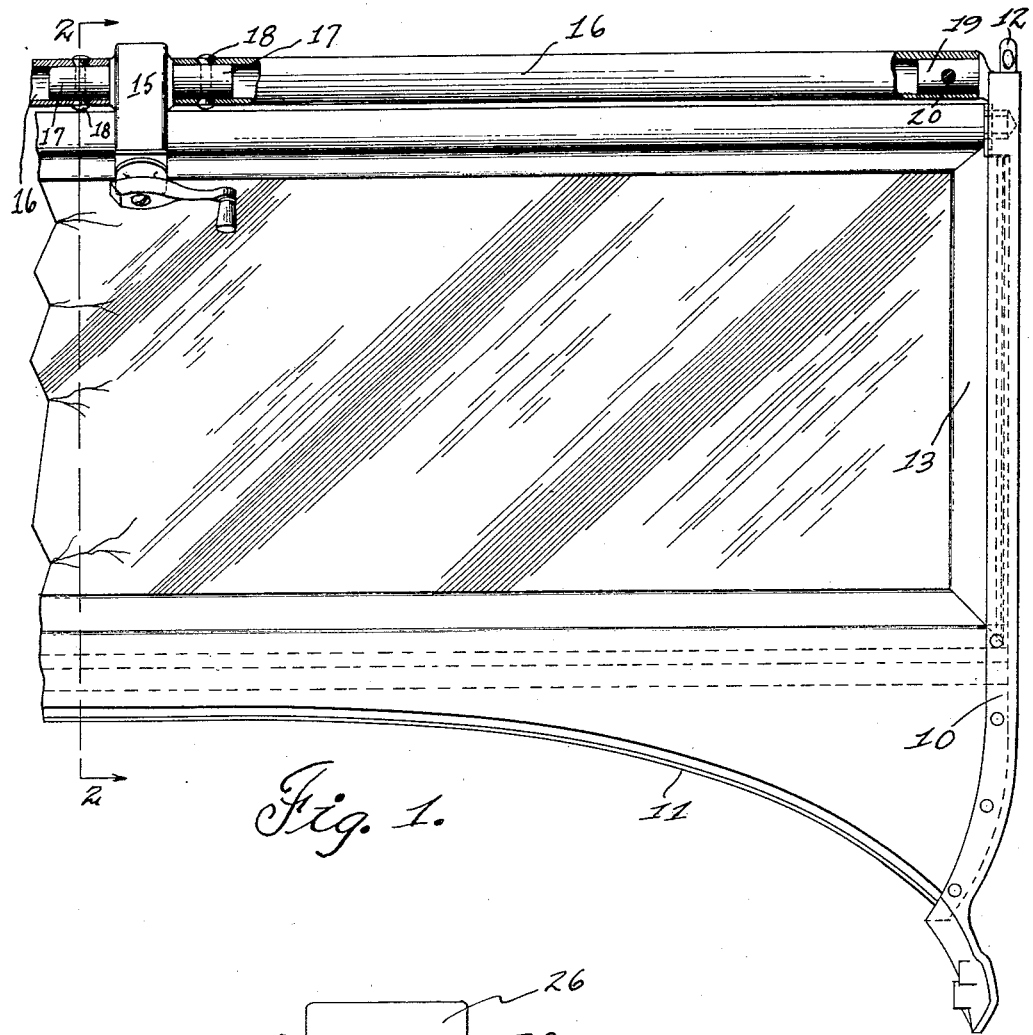
Figure 1 is a fragmentary front elevational view of a windshield and support therefor constructed in accordance with this invention.

Referring now particularly to the drawings wherein like reference characters indicate like parts, it will be noted that there is illustrated stanchions 10 secured to and extending upwardly from the body 11 of the vehicle. As is customary, a pair of these stanchions or upright posts are provided and each carries at its upper end a lug or pin 12 to which the front frame member of the top, whether the vehicle is of the open or convertible type, is connected and supported. The reference character 13 indicates generally a windshield of the swinging type which is pivotally supported upon the stanchions 10 by means of horizontally extending pivot pins 14.

The reference character 15 indicates generally a windshield operating mechanism which obviously may be of any desired type or construction but which is preferably of the general type illustrated and described in my co-pending applications Serial Numbers 130,031 and 166,572.

For supporting this operating mechanism I propose providing a supporting member consisting of a pair of tubular sections 16 which will telescope with studs or projections 17 extending laterally from the casing of the windshield operating mechanism 15 and the inner ends of the supporting member sections 16 may be rigidly connected to the projections 17 by means of rivets or bolts 18. The outer ends of the supporting members 16 telescopically receive studs or projections 19 projecting laterally from the upper ends of the stanchions 10. Bolts or pins 20 pass through the ends of the supporting member 16, and studs 19 for rigidly securing these parts together.

In Figure 3, I have shown a slightly modified form of connection between the stanchions 10 and the ends of the supporting member for the windshield operating mechanism. In this form of construction the stanchions 10 will stop short at the point indicated by the reference character 21 and the end of the supporting member 16 will be connected by means of a bracket 22 resting upon the upper ends of the stanchions and provided with a downwardly extending projection 23 secured, as for instance, by means of bolts 24 to the stanchion. This bracket member 22 is provided with a pivotal recess for receiving the pivot pin 14 of the windshield and is also provided with the top engaging lug 12. This bracket 22 may, and preferably is, assembled with the end of the supporting member 16 by means of a projection telescoping with the end of the support similar to the construction shown in Figure 1. With this construction it will be possible to manufacture and assemble the windshield, the operating mechanism therefor, the supporting member for the operating mechanism and the bracket 22 whereby with these parts assembled as a unit they may be conveniently assembled with the stanchions 10 secured to the body of the vehicle.

Figure 4:
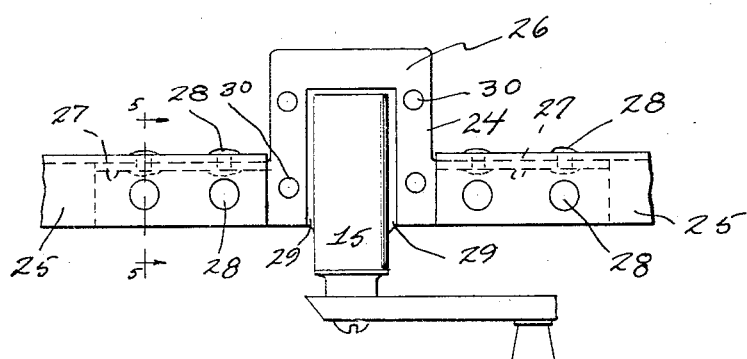
Figure 4 is a fragmentary elevational view of a modified form of supporting member.

In Figures 4 and 5 I have shown a slightly modified form of supporting member and connection between this member and the windshield operating mechanism 15. In this form of construction the sections of the supporting member are indicated at 25 and are formed of angle bars substantially L-shaped in cross section. In this connection it might be stated that it will be obvious that the supporting member may be made of bars having any desired cross sectional configuration.

By referring to Figure 4, it will be noted that the operating mechanism 15 is supported by means of a yoke 26 having laterally extending ends 27 which are secured as for instance, by means of bolts or rivets 28 to the adjacent ends of the supporting member sections 25. By making the yoke member 26 angular in cross section a flange is provided to which the flange 24 on the casing of the operating mechanism may be secured by means of bolts 30. With this construction, brackets 22, shown in Figure 3, may be provided having any suitable connection with the ends of the supporting members 25 whereupon the supporting members are rigidly secured to the upper ends of the stanchions.

From the foregoing, it will be readily apparent that this invention provides means for permanently supporting the windshield operating mechanism independently of the vehicle top so that windshields of this character may be used in connection with open and convertible types of bodies. It is obvious that the position of the operating mechanism may be varied by varying the length of the sections of the supporting member. In the drawings, the operating mechanism is shown located at the center of the vehicle.

It will also be apparent that the construction is such as to lend itself to economical and rapid production in large quantities and furthermore is one which may be assembled with facility.

While an embodiment and several modifications of the invention have been illustrated and described herein somewhat in detail, it will be readily apparent to those skilled in this art that various changes in many of the essential and all of the non-essential details of the construction may be resorted to without departing from the spirit and scope of the invention and to this end reservation is made to make such changes as may come within the purview of the accompanying claims.

What I claim as my invention is:

1. The combination with upright stanchions and a windshield swingingly mounted thereon, of an operating mechanism for said windshield, and a supporting member, sectional to facilitate assembly, including means connecting the inner ends of the sections to said operating mechanism and means for securing the outer ends of the sections to said stanchions.

2. The combination with a pair of upright stanchions and a swinging windshield mounted thereon, of an operating mechanism for said windshield, a supporting member extending between and secured to said stanchions and a yoke intermediate the ends of said member providing means for attaching said operating mechanism.

3. The combination with a pair of upright stanchions, of bracket members secured to and extending upwardly from said stanchions terminating in lateral inwardly projecting portions, a swinging windshield mounted upon said brackets below the lateral portions aforesaid, an operating mechanism for said windshield, and a supporting member having portions thereof sleeved upon and secured to said lateral portions, said supporting member having means for attaching said windshield operating mechanism.

4. The combination with upright stanchions and a windshield swingingly mounted thereon, of an encased operating mechanism for said windshield and a sectional supporting member therefor, said stanchions and the casing for said operating mechanism being provided with lateral projections to which the ends of the sectional supporting member are connected.

5. The combination with upright stanchions and a windshield disposed between the stanchions and mounted for swinging movement relative to the latter, of operating mechanism connected to the windshield intermediate the ends thereof for swinging the same and having projections extending laterally from opposite sides thereof in the direction of the length of the windshield, a supporting member comprising, sections disposed upon opposite sides of the operating mechanism and having the adjacent inner ends secured to the projections aforesaid, and means for securing the outer ends of the sections to the stanchions.

6. The combination with upright stanchions and a windshield disposed between the stanchions and mounted for swinging movement relative thereto, a sectional supporting member arranged above the windshield and having a pair of sections secured at the outer ends to the stanchions and having the inner ends terminating short of each other, and means interconnecting the inner ends of said sections including operating mechanism connected to the windshield for swinging the same.

In testimony whereof I affix my signature.

WILLIAM S. PRITCHARD.